United States Patent
Kim

(10) Patent No.: US 12,043,262 B2
(45) Date of Patent: Jul. 23, 2024

(54) SYSTEM AND METHOD FOR INTEGRATED MANAGEMENT OF VEHICLE SENSORS

(71) Applicant: HYUNDAI MOBIS CO., LTD., Seoul (KR)

(72) Inventor: Sung A Kim, Yongin-si (KR)

(73) Assignee: HYUNDAI MOBIS CO., LTD., Seoul (KR)

( * ) Notice: Subject to any disclaimer, the term of this patent is extended or adjusted under 35 U.S.C. 154(b) by 187 days.

(21) Appl. No.: 17/957,417

(22) Filed: Sep. 30, 2022

(65) Prior Publication Data
US 2023/0104192 A1    Apr. 6, 2023

(30) Foreign Application Priority Data
Oct. 6, 2021 (KR) .................. 10-2021-0132297

(51) Int. Cl.
*B60W 30/192* (2012.01)
*G06V 20/56* (2022.01)
*H04L 12/40* (2006.01)

(52) U.S. Cl.
CPC ........... *B60W 30/192* (2013.01); *H04L 12/40* (2013.01); *B60W 2420/408* (2024.01); *H04L 2012/40215* (2013.01); *H04L 2012/40273* (2013.01)

(58) Field of Classification Search
CPC .......... B60W 30/192; B60W 2420/408; H04L 2012/40215; H04L 2012/40273; H04L 12/12; H04L 12/40; G06V 20/56; B60R 16/023; B60R 16/033; B60Y 2400/30
See application file for complete search history.

(56) References Cited

U.S. PATENT DOCUMENTS

| | | | |
|---|---|---|---|
| 10,534,819 B2 * | 1/2020 | Ricci | A61B 5/7405 |
| 11,281,286 B1 * | 3/2022 | Kajuluri | G07C 5/0808 |
| 11,616,932 B1 * | 3/2023 | Xu | H04W 4/38 |
| | | | 348/207.99 |
| 2003/0183024 A1 * | 10/2003 | Lohberg | B60T 15/54 |
| | | | 73/865.9 |
| 2003/0222758 A1 * | 12/2003 | Willats | B60R 25/04 |
| | | | 340/5.72 |

(Continued)

FOREIGN PATENT DOCUMENTS

KR    10-2021-0076756 A    6/2021

*Primary Examiner* — Phutthiwat Wongwian
*Assistant Examiner* — Arnold Castro
(74) *Attorney, Agent, or Firm* — Novo TechIP International PLLC

(57) ABSTRACT

Disclosed herein are a system and method for integrated management of vehicle sensors. The system includes a starting state input unit configured to receive a starting state of a vehicle, a sensor interface unit physically connected to a sensor in the vehicle, a power supply unit configured to selectively supply battery power to the sensor, a system interface unit connected to a peripheral control device to transmit detection data of the sensor, a storage unit configured to store matching information of the sensor operated according to the starting state, and an integrated control unit configured to supply power to the selected sensor through the power supply unit based on the matching information, to process a detection signal input through the sensor interface unit to generate detection data, and then to transmit the detection data to the peripheral control device through the system interface unit.

10 Claims, 2 Drawing Sheets

(56) References Cited

U.S. PATENT DOCUMENTS

| | | | | |
|---|---|---|---|---|
| 2010/0312417 A1* | 12/2010 | Wakabayashi | ........ | G06F 1/3215 |
| | | | | 701/1 |
| 2015/0378865 A1* | 12/2015 | Robertson | ........... | G06F 11/0757 |
| | | | | 714/57 |
| 2023/0024793 A1* | 1/2023 | Isogai | .................... | A61B 5/002 |

* cited by examiner

SYSTEM AND METHOD FOR INTEGRATED MANAGEMENT OF VEHICLE SENSORS

CROSS-REFERENCE TO RELATED APPLICATIONS

This application claims the benefit of priority to Korean Patent Application No. 10-2021-0132297, filed on Oct. 6, 2021, of which the disclosure is incorporated herein by reference in its entirety.

TECHNICAL FIELD

Exemplary embodiments of the present disclosure relate to a system and method for integrated management of vehicle sensors, and more particularly, to a system and method for integrated management of vehicle sensors, which integrate a plurality of sensors used for a plurality of control devices in a vehicle to manage selective supply of power to the sensor(s) used according to the starting state of the vehicle, and process results of detection to provide the processed results to each control device.

BACKGROUND

In general, a variety of technologies are being researched and developed to improve safety and convenience of vehicles. For example, the vehicle is equipped with an advanced driver assist system (ADAS) that actively provides information on vehicle states, driver states, and surrounding environments in order to reduce driver's burden and increase convenience.

Recently, interest in autonomous driving technology has been on the rise. In connection with autonomous driving, SAE in the US defines 5 stages of autonomous driving and explains a driving initiative transition relationship between a driver's degree of freedom and an autonomous driving system for each stage.

The ADAS or autonomous driving technology uses a sensor that senses a vehicle position, a vehicle internal state, an external environment, and a driver state, as a very important factor. Inertial measurement sensors (IMUs), global positioning systems (GPSs), cameras, light detection and ranging (LIDAR), or the like may be used for vehicle position recognition. Cameras, LIDAR, radar, ultrasonic sensors, or the like are used for external environment or object recognition or distance measurement.

In addition, a plurality of sensors such as cameras or radar is mounted on the vehicle, as well as various sensors to determine the internal state of the vehicle.

The related art of the present disclosure is disclosed in Korean Patent Application Publication No. 10-2021-0076756 (published on Jun. 24, 2021, entitled "SENSOR FUSION DEVICE FOR VEHICLE).

When sensors are used redundantly to measure the same or similar physical quantity, ports and cables are also used redundantly for receiving sensor signals from each sensor, which may increase costs to manufacture and cause in-vehicle space waste.

In addition, when a plurality of control devices receives and processes the physical quantity of each sensor, the individual control devices not only check and process validity, but also all perform warning processing even if the sensor fails, which may lead to an increase in software or communication load factor.

SUMMARY

Various embodiments are directed to a system and method for integrated management of vehicle sensors, which are capable of integrating a plurality of sensors used for a plurality of control devices in a vehicle to manage selective supply of power to the sensor(s) used according to the starting state of the vehicle, and of processing results of detection to provide the processed results to each control device, thereby reducing redundant use of the sensors, improving a load factor of in-vehicle software or communication, and increasing vehicle fuel efficiency through improved dark current consumption.

In an embodiment, there is provided a system for integrated management of vehicle sensors, which includes a starting state input unit configured to receive a starting state of a vehicle, a sensor interface unit physically connected to a sensor in the vehicle, a power supply unit configured to selectively supply battery power to the sensor, a system interface unit connected to a peripheral control device to transmit detection data of the sensor, a storage unit configured to store matching information of the sensor operated according to the starting state, and an integrated control unit configured to supply power to the selected sensor through the power supply unit based on the matching information stored in the storage unit according to the starting state input to the starting state input unit, to process a detection signal input through the sensor interface unit to generate detection data, and then to transmit the detection data to the peripheral control device through the system interface unit.

The starting state input unit may receive one of an ignition-off state or a state of charge, an accessory state, an ignition-on state or a driving state, and a start state.

When the sensor interface unit determines that an error occurs in validity of electrical characteristics of the detection signal, the integrated control unit may output a sensor error signal through the system interface unit.

When the sensor interface unit determines that an error occurs in the validity of electrical characteristics, the integrated control unit may reset sensors.

When an event is detected from the detection signal in an ignition-off state, the integrated control unit may output a wake-up signal to a corresponding peripheral control device.

In another embodiment, there is provided a method for integrated management of vehicle sensors, which includes receiving, by an integrated control unit, a starting state of a vehicle from a starting state input unit, selecting, by the integrated control unit, a sensor based on matching information stored in a storage unit according to the starting state, supplying, by the integrated control unit, power to the selected sensor through a power supply unit, generating, by the integrated control unit, detection data by processing a detection signal of the sensor input through a sensor interface unit, and transmitting, by the integrated control unit, the detection data to a peripheral control device through a system interface unit.

The receiving, by an integrated control unit, a starting state of a vehicle may include receiving one of an ignition-off state or a state of charge, an accessory state, an ignition-on state or a driving state, and a start state.

The generating, by the integrated control unit, detection data may include, when the sensor interface unit determines that an error occurs in validity of electrical characteristics of the detection signal, outputting, by the integrated control unit, a sensor error signal through the system interface unit.

The generating, by the integrated control unit, detection data may further include, when the sensor interface unit determines that an error occurs in the validity of electrical characteristics, resetting sensors by the integrated control unit.

The method may further include, when an event is detected from the detection signal in an ignition-off state, outputting, by the integrated control unit, a wake-up signal to a corresponding peripheral control device.

As apparent from the above description, the system and method for integrated management of vehicle sensors according to the present disclosure integrate a plurality of sensors used for a plurality of control devices in the vehicle to manage the selective supply of power to the sensor(s) used according to the starting state of the vehicle, and process the results of detection to provide the processed results to each control device. Therefore, it is possible to reduce the redundant use of the sensors, to improve the load factor of in-vehicle software or communication, and to increase vehicle fuel efficiency through improved dark current consumption.

DETAILED DESCRIPTION

Figure 1:
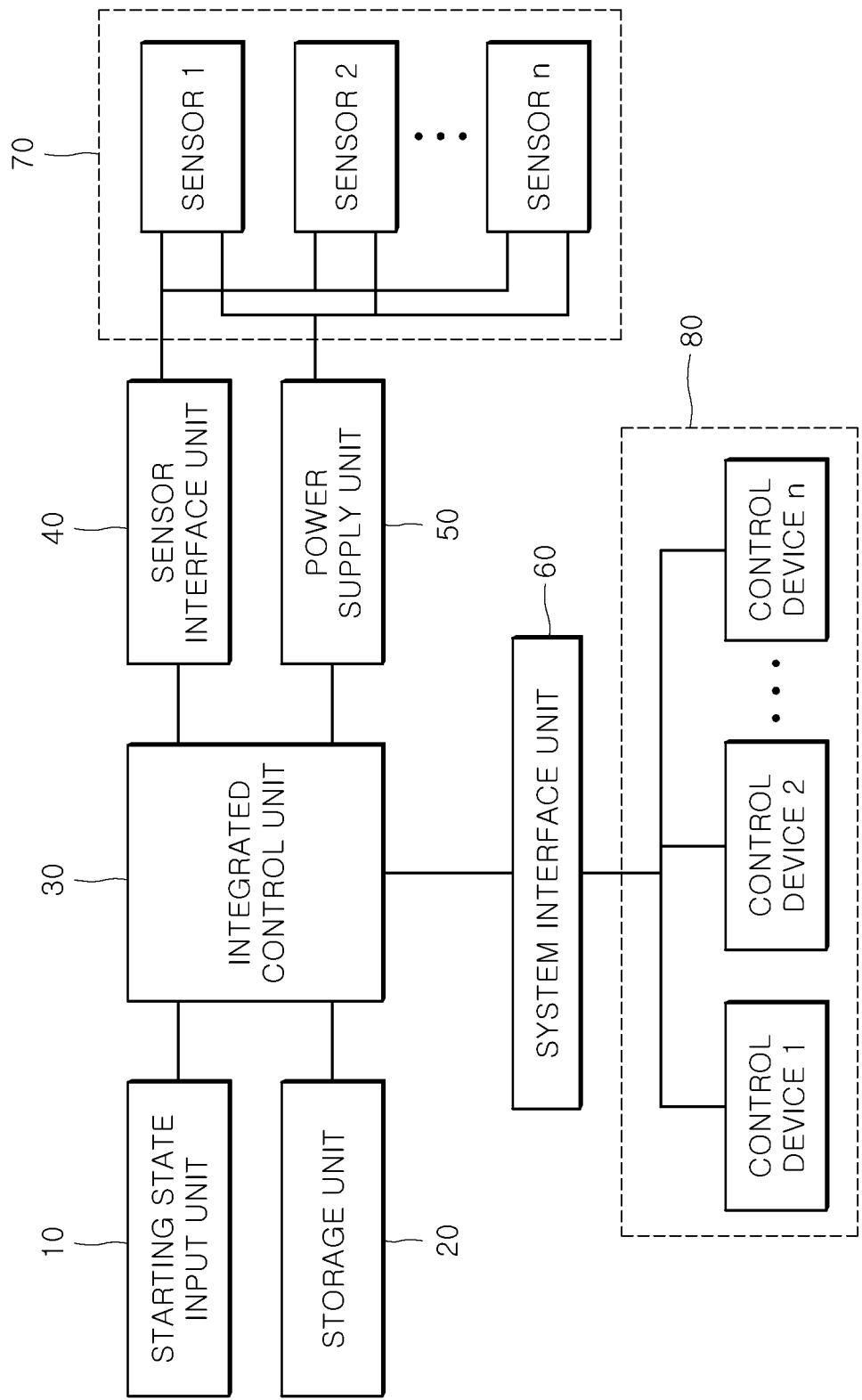
FIG. 1 is a block diagram illustrating a system for integrated management of vehicle sensors according to an embodiment of the present disclosure.

Hereinafter, a system and method for integrated management of vehicle sensors according to the present disclosure will be described with reference to the accompanying drawings. It should be considered that the thickness of each line or the size of each component in the drawings may be exaggeratedly illustrated for clarity and convenience of description. In addition, the terms used herein are terms defined in consideration of functions of the present disclosure, and these terms may change depending on the intention or practice of a user or an operator. Therefore, these terms should be defined based on the entirety of the disclosure set forth herein.

FIG. 1 is a block diagram illustrating a system for integrated management of vehicle sensors according to an embodiment of the present disclosure.

As illustrated in FIG. 1, the system for integrated management of vehicle sensors according to the embodiment of the present disclosure may include a starting state input unit 10, a sensor interface unit 40, a power supply unit 50, a system interface unit 60, a storage unit 20, and an integrated control unit 30.

The starting state input unit 10 may receive a starting state of a vehicle from an ignition switch (not shown) of the vehicle or other control devices in the vehicle. The starting state input unit 10 may be an input terminal including a controller area network (CAN) communication element or the like.

Here, the starting state may be one of an ignition-off state or a state of charge, an accessory state, an ignition-on state or a driving state, and a start state in the vehicle.

The sensor interface unit 40 may be physically connected to a sensor 70 in the vehicle to receive a physical detection signal input from the sensor 70. In addition, the sensor interface unit 40 may determine validity of electrical characteristics of the physical detection signal input from the sensor 70.

The sensor interface unit 40 may include a CAN communication element, a wire for transmitting and receiving signals between devices, and so on.

The power supply unit 50 may selectively supply battery power to the sensor 70 to operate only the selected sensor 70. The power supply unit 50 may be connected to a battery, and configured as a circuit including a switching element to selectively turn on/off the supply of battery power to the sensor 70. However, since the circuit for selectively turning on/off power may be operated in a known manner, a detailed description thereof will be omitted.

The system interface unit 60 may be connected to a peripheral control device 80 to transmit detection data of the sensor 70. The system interface unit 60 may include a CAN communication element, a wire for transmitting and receiving signals between devices, and so on.

The storage unit 20 may store matching information of the sensor 70 operated according to the starting state of the vehicle. The storage unit 20 may include a non-volatile memory and so on.

Here, the matching information may be configured based on the starting state and the sensor 70 used when the peripheral control device 80 performs a control function.

The integrated control unit 30 may supply power to the selected sensor 70 through the power supply unit 50 based on the matching information stored in the storage unit 20 according to the starting state of the vehicle input to the starting state input unit 10, process the detection signal input through the sensor interface unit 40 to generate detection data, and then transmit the detection data to the peripheral control device 80 through the system interface unit 60.

The integrated control unit 30 may be a controller commonly referred to as an electronic control unit (ECU), a micro controller unit (MCU), or the like.

For example, the integrated control unit 30 may process a detection signal of a temperature sensor to generate detection data in units of temperature, or may process a detection signal of a vehicle speed sensor to generate detection data in units of speed.

Here, when the sensor interface unit 40 determines that an abnormality (e.g., an error with respect to a validity of electrical characteristics) of the physical detection signal, the integrated control unit 30 may output a sensor error signal through the system interface unit 60 to send a warning through the control device 80.

In addition, when the sensor interface unit 40 determines that an error occurs in the validity of electrical characteristics, the integrated control unit 30 may reset sensors by turning off/on power.

Meanwhile, when an event is detected from the detection signal in the ignition-off state, the integrated control unit 30 may output the detection data together with a wake-up signal to the corresponding peripheral control device 80.

For example, in order to check an event input from a shock sensor in an anti-theft device, it is necessary to determine a detection signal in a permanently-activated state. However, when a detection signal is input together with a wake-up signal when an event occurs from a shock sensor as in the present embodiment, an anti-theft device may be activated by the wake-up signal while remaining in a sleep mode to perform the function of the anti-theft device, thereby improving power consumption.

As described above, the system for integrated management of vehicle sensors according to the embodiment of the present disclosure integrates a plurality of sensors used for a plurality of control devices in the vehicle to manage the selective supply of power to the sensor(s) used according to the starting state of the vehicle and processes the results of detection to provide the processed results to each control device. Therefore, it is possible to reduce the redundant use of the sensors, to improve the load factor of in-vehicle software or communication, and to increase vehicle fuel efficiency through improved dark current consumption.

Figure 2:
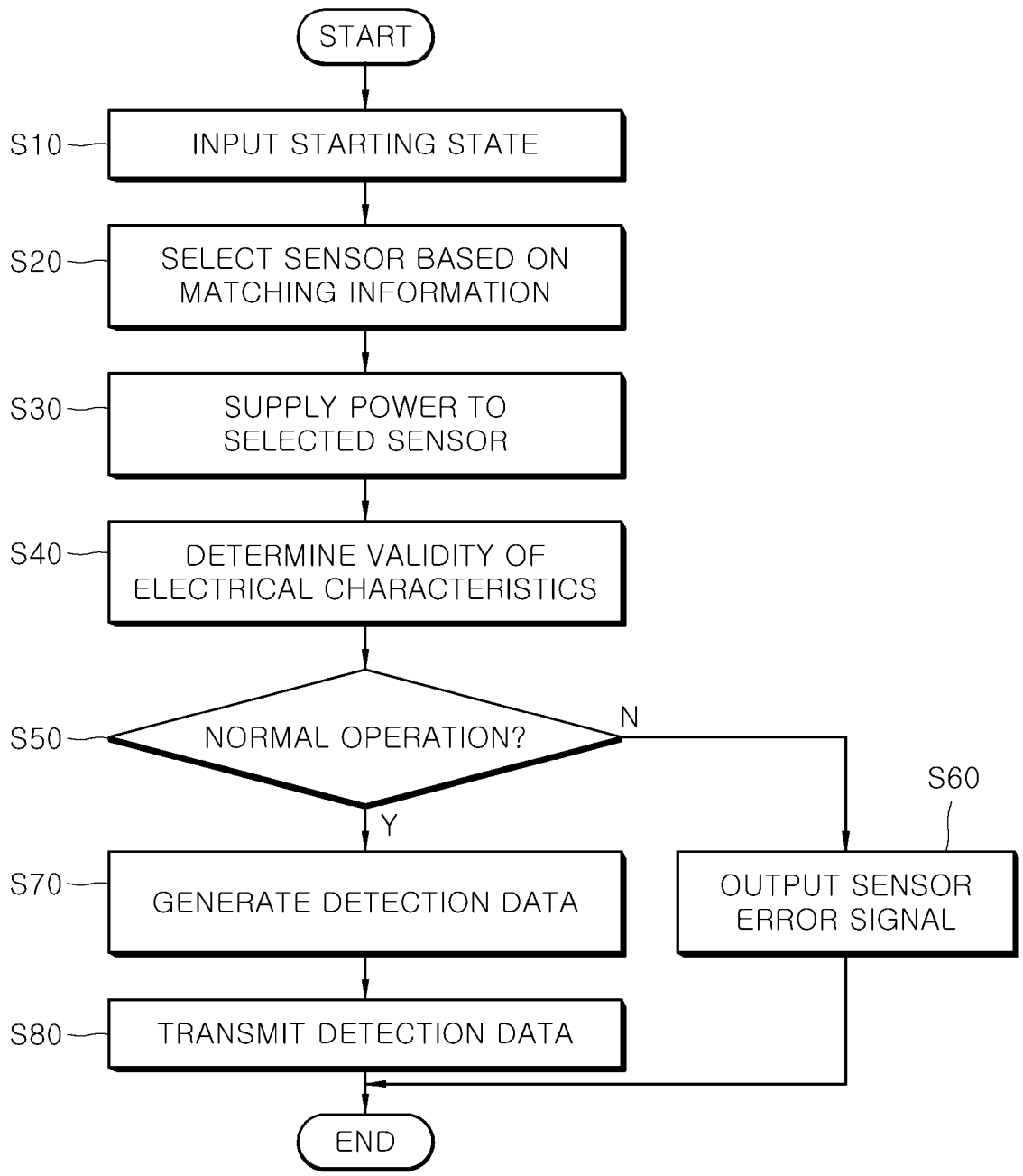
FIG. 2 is a flowchart for explaining a method for integrated management of vehicle sensors according to an embodiment of the present disclosure.

FIG. 2 is a flowchart for explaining a method for integrated management of vehicle sensors according to an embodiment of the present disclosure.

As illustrated in FIG. 2, in the method for integrated management of vehicle sensors according to the embodiment of the present disclosure, first, an integrated control unit 30 receives a starting state of a vehicle from a starting state input unit 10 (S10).

Here, the starting state may be one of an ignition-off state or a state of charge, an accessory state, an ignition-on state or a driving state, and a start state in the vehicle.

After the starting state of the vehicle is input in step S10, the integrated control unit 30 selects a sensor 70 based on matching information stored in a storage unit 20 according to the starting state (S20).

When the sensor 70 to be operated is selected in step S20, the integrated control unit 30 supplies power to the selected sensor 70 through a power supply unit 50 (S30).

When the selected sensor 70 is operated by the power supplied thereto in step S30, a sensor interface unit 40 determines validity of electrical characteristics of the input physical detection signal of the sensor 70 (S40).

When the sensor interface unit 40 determines that an error occurs in the validity of the sensor 70 in step S40, the integrated control unit 30 outputs a sensor error signal to a peripheral control unit 80 through a system interface unit 60 to send a warning (S60).

In this case, when the sensor interface unit 40 determines that an error occurs in the validity of the sensor 70, the integrated control unit 30 may also reset sensors by turning off/on power.

When it is determined that the sensor 70 is normal in the validity thereof in step S40, the integrated control unit 30 processes the detection signal input through the sensor interface unit 40 to generate detection data (S70).

For example, the integrated control unit 30 may process a detection signal of a temperature sensor to generate detection data in units of temperature, or may process a detection signal of a vehicle speed sensor to generate detection data in units of speed.

After the detection data is generated in step S70, the integrated control unit 30 transmits the detection data to the peripheral control unit 80 through the system interface unit 60 (S80).

Here, when an event is detected from the detection signal in the ignition-off state, the integrated control unit 30 may output the detection data together with a wake-up signal to the corresponding peripheral control device 80.

As described above, according to the system and method for integrated management of vehicle sensors of the present disclosure, it is possible to reduce the redundant use of the sensors, to improve the load factor of in-vehicle software or communication, and to increase vehicle fuel efficiency through improved dark current consumption, by integrating a plurality of sensors used for a plurality of control devices in the vehicle to manage the selective supply of power to the sensor(s) used according to the starting state of the vehicle and processing the results of detection to provide the processed results to each control device.

The implementations described herein may be implemented in, for example, a method or a process, an apparatus, a software program, a data stream, or a signal. Even if only discussed in the context of a single form of implementation (for example, discussed only as a method), the implementation of features discussed may also be implemented in other forms (e.g., an apparatus or program). The apparatus may be implemented in, for example, appropriate hardware, software, and firmware. The method may be implemented in, for example, an apparatus such as a processor, which refers to a processing device in general, including, for example, a microprocessor, an integrated circuit, or a programmable logic device.

While the present disclosure has been described with respect to the embodiments illustrated in the drawings, it will be obvious to those skilled in the art that such embodiments are provided by way of example only. It will be understood by those skilled in the art that various modifications and other equivalent embodiments may be made without departing from the spirit and scope of the disclosure as defined in the following claims.

Therefore, the technical protection scope of the present disclosure should be defined by the following claims.

What is claimed is:

1. A system for performing integrated management of a sensor of a vehicle, the vehicle including a peripheral control device configured to perform a control function, the system comprising:
    a power supply unit configured to selectively supply power to the sensor;
    a sensor interface unit coupled to the sensor and configured to receive a detection signal from the sensor;
    a system interface unit coupled to the peripheral control device;
    a storage unit configured to store matching information of the sensor operated according to a starting state of the vehicle; and
    an integrated control unit configured to:
        control the power supply unit to supply the power to the sensor based on the matching information according to the starting state of the vehicle;
        process the detection signal to generate detection data; and
        transmit the detection data to the peripheral control device through the system interface unit.

2. The system according to claim 1, wherein the starting state is one of an ignition-off state or a state of charge, an accessory state, an ignition-on state or a driving state, and a start state.

3. The system according to claim 1, wherein the integrated control unit is configured to, in response to the sensor interface unit detecting an abnormality in the detection signal, output a sensor error signal through the system interface unit.

4. The system according to claim 3, wherein the integrated control unit is further configured to, in response to the sensor interface unit detecting the error in the detection signal, reset the sensor.

5. The system according to claim 1, wherein the integrated control unit is configured to, in response to detecting an event from the detection signal when the starting state is an ignition-off state, output a wake-up signal to the peripheral control device.

6. A method for performing integrated management of a plurality of sensors of a vehicle, the method comprising:
    storing, in a data storage, matching information of each of the sensors operated according to a starting state of the vehicle;
    receiving a starting state of a vehicle;
    selecting, from the plurality of sensors, a first sensor based on the stored matching information;
    causing power to be supplied to the selected first sensor;

receiving and processing a detection signal from the first sensor to generate detection data; and transmitting the detection data to a peripheral control device configured to perform a control function.

7. The method of claim 6, wherein receiving the starting state of the vehicle comprises receiving one of an ignition-off state or a state of charge, an accessory state, an ignition-on state or a driving state, and a start state.

8. The method of claim 6, wherein generating the detection data comprises outputting, in response to detecting an abnormality in the detection signal, a sensor error signal.

9. The method of claim 8, further comprising resetting the first sensor in response detecting the abnormality in the detection signal.

10. The method of claim 6, further comprising, in response to detecting an event from the detection signal when the starting state of the vehicle is an ignition-off state, outputting a wake-up signal to the peripheral control device.

\* \* \* \* \*